United States Patent
Chuang et al.

(10) Patent No.: US 11,252,372 B2
(45) Date of Patent: Feb. 15, 2022

(54) PAYLOAD MAPPER AND PAYLOAD MAPPING METHOD

(71) Applicant: REALTEK SEMICONDUCTOR CORPORATION, Hsinchu (TW)

(72) Inventors: Bing-Juo Chuang, Hsinchu (TW);
Yun-Yueh Lee, New Taipei (TW);
Shan-Hsuan Huang, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/023,453

(22) Filed: Sep. 17, 2020

(65) Prior Publication Data
US 2021/0099668 A1  Apr. 1, 2021

(51) Int. Cl.
H04N 7/035 (2006.01)
H04N 21/4402 (2011.01)
H04L 29/06 (2006.01)
H04L 69/22 (2022.01)

(52) U.S. Cl.
CPC ......... *H04N 7/035* (2013.01); *H04N 21/4402* (2013.01); *H04L 69/22* (2013.01)

(58) Field of Classification Search
CPC ... H04L 1/1861; H04L 47/365; H04L 5/0044; H04L 69/22; H04N 21/4307; H04N 21/4402; H04N 7/035; H04N 21/43632; G09G 2360/02; G09G 2370/12; G09G 2370/10; G09G 5/005
See application file for complete search history.

(56) References Cited

U.S. PATENT DOCUMENTS

| | | | |
|---|---|---|---|
| 7,310,353 B1 * | 12/2007 | Bourlas | H04L 12/5601 370/395.2 |
| 9,274,978 B2 * | 3/2016 | DeForest | G06F 12/1408 |
| 9,571,880 B2 | 2/2017 | Chuang et al. | |

(Continued)

FOREIGN PATENT DOCUMENTS

TW  201517611 A  5/2015
TW  M527115 U  8/2016

OTHER PUBLICATIONS

OA letter of the counterpart TW application (appl. No. 108135096) mailed on Jan. 7, 2021. Summary of the OA letter.

(Continued)

*Primary Examiner* — Paulos M Natnael
(74) *Attorney, Agent, or Firm* — WPAT, PC

(57) ABSTRACT

Disclosed is a payload mapper including N mapper(s), each of which includes a controller, multiple mapping circuits, an output control circuit, and a storage circuit. The controller includes: a decoding circuit receiving a first-format signal and decoding at least a part of this signal to find out the type of a control signal relating to the first-format signal; and a conversion control circuit generating a selecting signal according to the type of the control signal to choose one of the mapping circuits. The mapping circuits receive the first-format signal and selecting signal, and the selected mapping circuit converts the first-format signal into a second-format signal according to the selecting signal. The output control circuit is coupled to the mapping circuits and outputs at least a part of the second-format signal as an effective output signal. The storage circuit temporarily stores the effective output signal and then outputs it.

11 Claims, 17 Drawing Sheets

(56) References Cited

U.S. PATENT DOCUMENTS

| | | | | |
|---|---|---|---|---|
| 10,575,285 B2* | 2/2020 | Chen | ............... | H04L 1/0031 |
| 2004/0117840 A1* | 6/2004 | Boudreau | ......... | H04N 21/4363 |
| | | | | 725/98 |
| 2009/0245292 A1* | 10/2009 | Koganei | ............ | H04L 25/4908 |
| | | | | 370/535 |
| 2013/0235072 A1* | 9/2013 | Longhurst | ............ | H04N 19/184 |
| | | | | 345/605 |
| 2013/0276022 A1* | 10/2013 | Tidwell | ............... | H04N 21/812 |
| | | | | 725/34 |
| 2014/0365785 A1* | 12/2014 | Deforest | ............ | G06F 12/0246 |
| | | | | 713/193 |
| 2017/0041922 A1* | 2/2017 | Chen | ................ | H04W 72/1268 |

OTHER PUBLICATIONS

DP_v2.0_d2_redline, www.vesa.org, "VESA DisplayPort (DP) Standard",Feb. 22, 2019, Version 2.0 (proposed), d2, 2006-2019 Video Electronics Standards Association.

* cited by examiner

| Input data type | BS | VBID | SS | SDP DATA | SS | SS | MSA DATA | MSA DATA | MSA DATA | SE | SDP DATA | SE | SF |
|---|---|---|---|---|---|---|---|---|---|---|---|---|---|
| st_main | BLANKING | VBID MAPPER | IDLE/BLANKING | SS1 | SDP MAPPER | SS1 | SS2 | MSA Mapper | | | SE_ST | SDP MAPPER | Blanking |
| st_sdp | IDLE | | | SS1 | | | HB_AND_DATA | | | | | | IDLE |
| activated block | Control Symbol Mapper | VBID Mapper | | Control Symbol Mapper | SDP MAPPER | Control Symbol Mapper | | MSA Mapper | | | Control Symbol Mapper | SDP MAPPER | Control Symbol Mapper |

Fig. 7f

| Input data type | BS | VBID | SS | SDP DATA | SDP DATA | SS | SS | MSA DATA | MSA DATA | MSA DATA | SE | SE | SF |
|---|---|---|---|---|---|---|---|---|---|---|---|---|---|
| st_main | BLANKING | VBID_MAPPER | IDLE/BLANKING | SS1 | SDP_MAPPER | SDP_MAPPER | SS1 | SS2 | MSA Mapper | MSA Mapper | | SE_ST | Blanking |
| st_sdp | IDLE | | | SS1 | RB_AND_DATA | RB_AND_DATA | RB_AND_DATA | RB_AND_DATA | RB_AND_DATA | RB_AND_DATA | | | IDLE |
| activated block | Control Symbol Mapper | VBID Mapper | Control Symbol Mapper | SDP MAPPER | SDP MAPPER | SDP MAPPER | Control Symbol Mapper | MSA Mapper | MSA Mapper | MSA Mapper | | Control Symbol Mapper | |

Fig. 7g

PAYLOAD MAPPER AND PAYLOAD MAPPING METHOD

BACKGROUND OF THE INVENTION

1. Field of the Invention

The present disclosure relates to a payload mapper and payload mapping method, especially to a payload mapper and payload mapping method performing conversion with one of multiple mapping circuits.

2. Description of Related Art

A branch (e.g., DisplayPort branch) is capable forwarding a signal from a source interface (e.g., DisplayPort interface) to a target interface (e.g., DisplayPort interface or High-Definition Multimedia Interface (HDMI) interface). If the coding type of the signal of the source interface is different from that of the target interface, the branch needs to perform signal conversion adaptively.

Take a DisplayPort branch supporting the version 2.0 of the DisplayPort™ audio/video standard (DisplayPort 2.0 standard) for example. Since the DisplayPort 2.0 standard defines two types of channel coding that are the 128b/132b channel coding and 8b/10b channel coding respectively, the forwarding operation performed by the DisplayPort branch for the communication between the source interface and the target interface should relate to one of the following four circumstances:
(1) Both the source interface and target interface use the 8b/10b channel coding;
(2) The source interface uses the 8b/10b channel coding, but the target interface uses the 128b/132b channel coding;
(3) The source interface uses the 128b/132b channel coding, but the target interface uses the 8b/10b channel coding; and
(4) Both the source interface and target interface use 128b/132b channel coding.

The forwarding operation in the circumstance (1) is supported by the DisplayPort 2.0 standard. The circumstance (2) has little to be worried as a DisplayPort branch can directly forward signals of the 8b/10b channel coding when the source interface uses the 8b/10b channel coding. The forwarding operation in the circumstance (4) is also supported by the DisplayPort 2.0 standard.

However, the DisplayPort 2.0 standard does not specify how to perform the forwarding operation in the circumstance (3). Therefore, a practical technique to realize the forwarding operation in the circumstance (3) is desired.

SUMMARY OF THE INVENTION

An object of the present disclosure is to provide a payload mapper and payload mapping method capable of converting a first format signal into a second format signal.

An embodiment of the payload mapper of the present disclosure includes N mapper(s), wherein the N is a positive integer. Each of the N mapper(s) is configured to convert a first format signal into a second format signal and includes a controller, multiple mapping circuits, an output control circuit, and a storage circuit. The controller includes a decoding circuit and a conversion control circuit; the decoding circuit is configured to receive the first format signal and decode at least a part of the first format signal so as to find out a type of a control signal relating to the first format signal; and the conversion control circuit is configured to generate a selecting signal according to the type of the control signal, wherein the selecting signal is used for choosing one of the multiple mapping circuits to perform conversion. The multiple mapping circuits are configured to receive the first format signal and the selecting signal, and include a control symbol mapping circuit, a vertical blanking identifier (VB-ID) mapping circuit, a main stream attribute (MSA) mapping circuit, a secondary data packet (SDP) mapping circuit, and a video mapping circuit. The control symbol mapping circuit is configured to convert the first format signal into the second format signal on condition that the selecting signal chooses the control symbol mapping circuit for performing conversion. The VB-ID mapping circuit is configured to convert the first format signal into the second format signal on condition that the selecting signal chooses the VB-ID mapping circuit for performing conversion. The MSA mapping circuit is configured to convert the first format signal into the second format signal on condition that the selecting signal chooses the MSA mapping circuit for performing conversion. The SDP mapping circuit is configured to convert the first format signal into the second format signal on condition that the selecting signal chooses the SDP mapping circuit for performing conversion. The video mapping circuit is configured to convert the first format signal into the second format signal on condition that the selecting signal chooses the video mapping circuit for performing conversion. The output control circuit is coupled to the multiple mapping circuits and configured to output at least a part of the second format signal as an effective output signal. The storage circuit is configured to receive and output the effective output signal.

Another embodiment of the payload mapper of the present disclosure includes N mapper(s), wherein the N is a positive integer. Each of the N mapper(s) is configured to convert a first format signal into a second format signal and includes a controller, multiple mapping circuits, an output control circuit, and a storage circuit. The controller includes a decoding circuit and a conversion control circuit; the decoding circuit is configured to receive the first format signal and decode at least a part of the first format signal so as to find out a type of a control signal relating to the first format signal; and the conversion control circuit is configured to generate a selecting signal according to the type of the control signal, wherein the selecting signal is used for choosing one of the multiple mapping circuits to perform conversion. The multiple mapping circuits are configured to receive the first format signal and the selecting signal so that the one of the multiple mapping circuits converts the first format signal into the second format signal according to the selecting signal. The output control circuit is coupled to the multiple mapping circuits and configured to output at least a part of the second format signal as an effective output signal. The storage circuit is configured to receive and output the effective output signal.

An embodiment of the payload mapping method of the present disclosure is performed with N mapper(s), wherein the N is a positive integer. Each of the N mapper(s) is configured to convert a first format signal into a second format signal. In this embodiment, the payload mapping method includes the following steps: receiving some or all of the first format signal and decoding at least a part of the first format signal so as to find out a type of a control signal relating to the first format signal; generating a selecting signal according to the type of the control signal; choosing one of multiple mapping circuits according to the selecting signal and thereby having the one of the multiple mapping circuits convert the first format signal into the second format signal; outputting at least a part of the second format signal as an effective output signal; and storing the effective output signal in a storage circuit according to a clock of a first clock domain and then outputting the effective output signal of the storage circuit according to a clock of a second clock domain.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 5b shows an embodiment of each mapper in FIG. 5a.

FIGS. 7d-7g show how the conversion control circuit of FIG. 6 chooses a mapping circuit (activated block) according to the type of a control signal, the state of the main stream FSM, and the state of the SDP stream FSM.

DETAILED DESCRIPTION OF THE PREFERRED EMBODIMENTS

Figure 1:
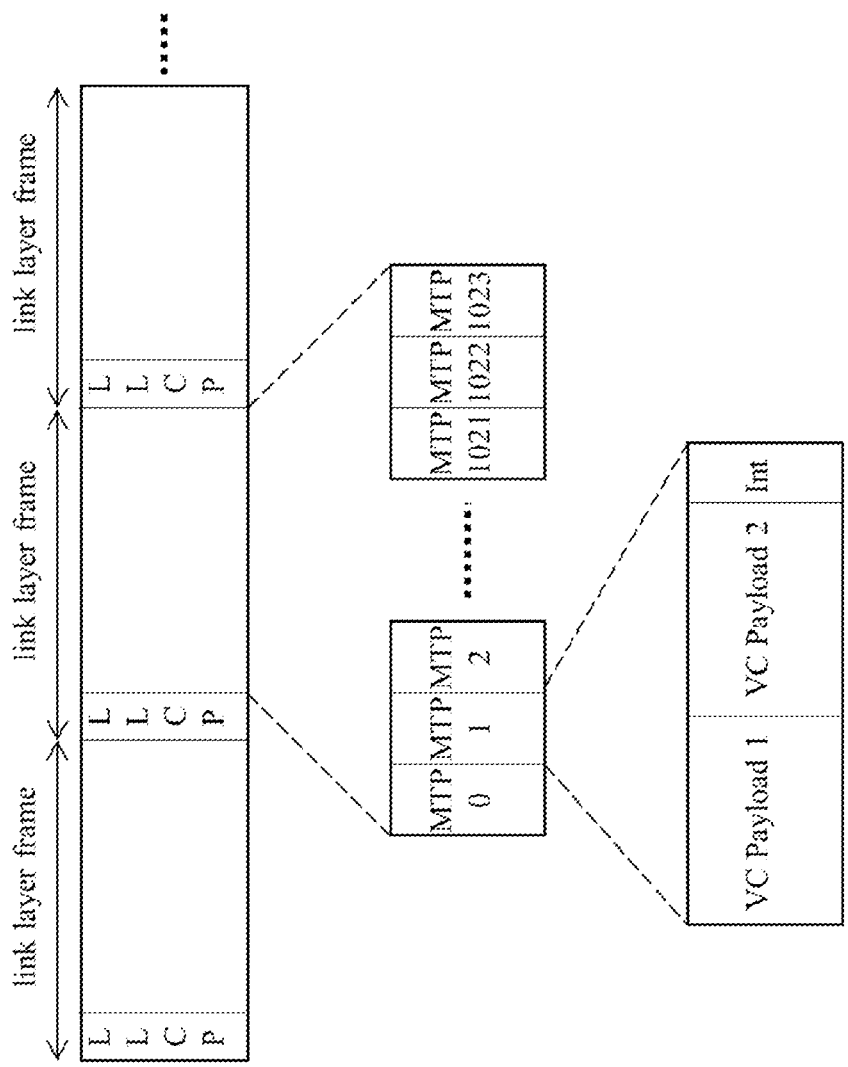
FIG. 1 shows a conventional multi-stream transport (MST) signal of the 128b/132b channel coding.
Figure 2:
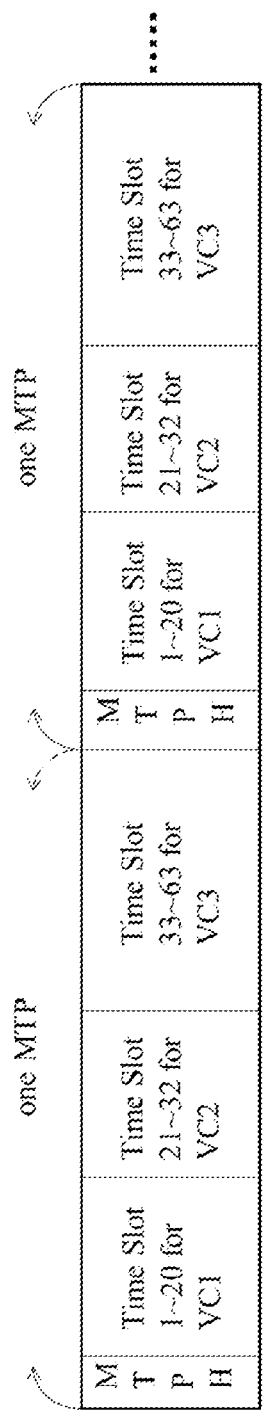
FIG. 2 shows a conventional MST signal of the 8b/10b channel coding.

The present disclosure discloses a payload mapper configured to convert N first format signal(s) into N second format signal(s), that is to say, the payload mapper configured to rearrange the contents of the N first format signal(s) and thereby generate the N second format signal(s), wherein the number N is a positive integer such as an integer greater than one. For example, the payload mapper is included in a DisplayPort branch which supports the DisplayPort 2.0 standard and is capable of forwarding a multi-stream transport (MST) signal. Prior to the forwarding operation, the MST signal could be a 128b/132b channel coding signal as shown in FIG. 1; after the forwarding operation, the MST signal could be a 8b/10b channel coding signal as shown in FIG. 2. The MST signal of FIG. 1 includes a plurality of link layer frames, each of which includes a field of the link layer control protocol (LLCP) and a plurality of MST packets (MTPs) (e.g., MTP_0~MTP_1023); each MTP includes a plurality of virtual channel payloads (VC payloads) (e.g., VC Payload_1~VC Payload_2) and an MTP interval (Int); the aforementioned N first format signal(s) is/are originated from one MTP and related to N VC payload(s); each first format signal includes data signals of four lanes (lane0~lane3) and a control signal; the data signal of each of the four lanes is a 32-bit signal; and in this disclosure, [X:01] denotes (X+1) bits. The MST signal of FIG. 2 includes a plurality of MTPs, each of which includes a multi-stream transport packet header (MTPH) and a plurality of time slots (e.g., Time Slot 1~20, Time Slot 21-32, and Time Slot 33-63) that are assigned to different virtual channels (e.g., VC1, VC2, VC3) respectively for carrying payloads; the N VC payload(s) of the virtual channels is/are originated from the aforementioned N second format signal(s); each second format signal includes the signal(s) of one, two, or four lanes and the control signal; and the signal of each lane is an 8-bit signal.

Figure 3:
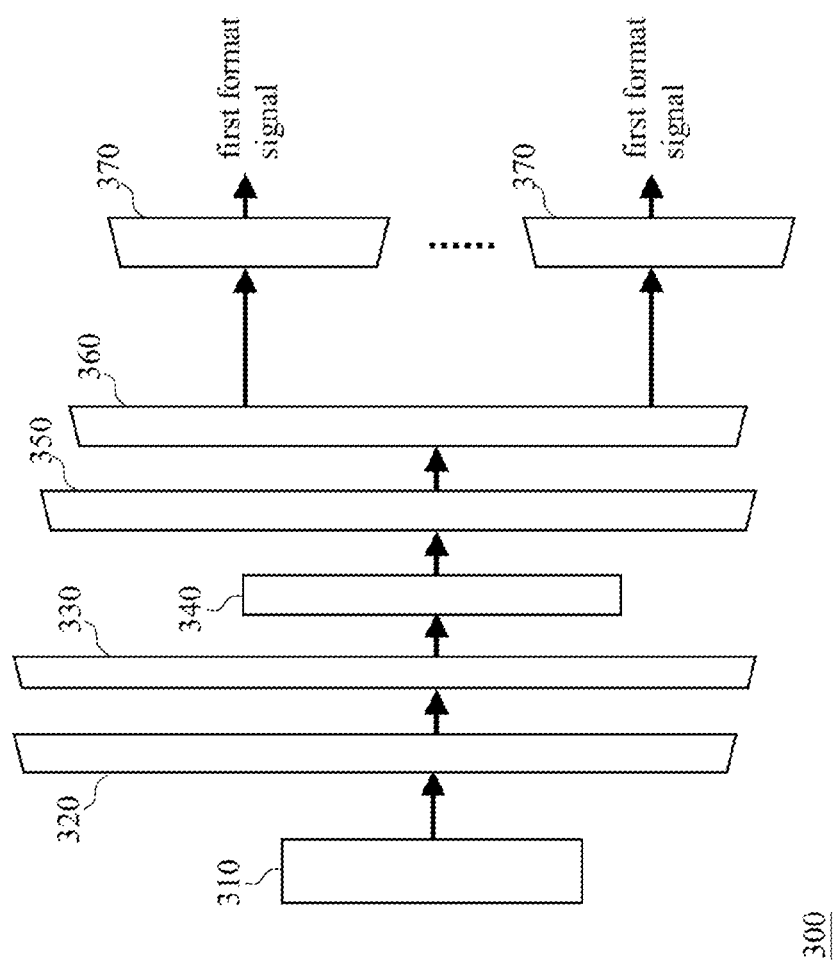
FIG. 3 shows the front-end circuits of a conventional DisplayPort branch.
Figure 4:
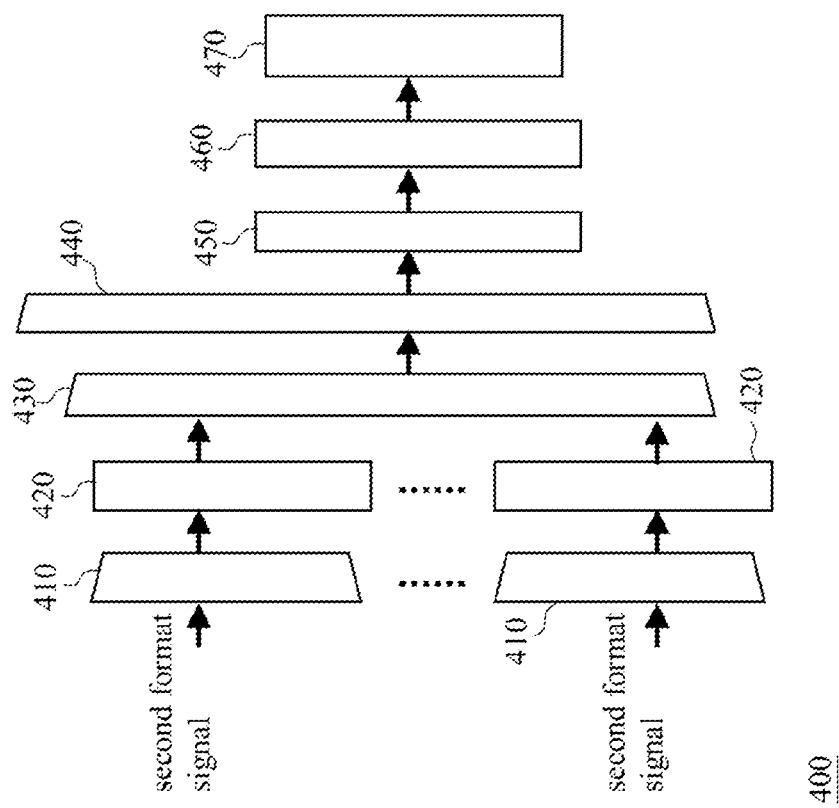
FIG. 4 shows the back-end circuits of a conventional DisplayPort branch.

On the basis of the aforementioned example, the front-end circuits of the branch generate the N first format signal(s) according to the MST signal of the 128b/132b channel coding and output it/them to the payload mapper of the present disclosure; then the payload mapper outputs the N second format signal(s) to the back-end circuits of the branch so that the back-end circuits can use the converted MST signal of the 8b/10b channel coding accordingly; in brief, the branch performs the conversion and forwarding operation of the MST signal with the payload mapper of the present disclosure. FIG. 3 shows an example of the front-end circuits of the branch. As shown in FIG. 3, the functional blocks of the front-end circuits 300 of the branch include a 128b/132b Channel Coding PHY Layer Logical Sub-layer 310, a Coding Overhead Place Holder Symbol Demuxer 320, a PHY Sync Symbol Place Holder Symbol Demuxer 330, a Content Protection Cipher for Decryption 340, an LLCP demultiplexer 350, an MTP demultiplexer 360, and N payload demuxer(s) 370. These functional blocks are described in the DisplayPort 2.0 standard or the related standard and fall beyond the scope of the present disclosure. FIG. 4 shows an example of the back-end circuits of the branch. As shown in FIG. 4, the functional blocks of the back-end circuits 400 of the branch includes N payload multiplexer(s) 410, N Lane Count Adjust(s) (4 lanes to actual lane count) 420, a Non-MTPH Multiplexer (for non-header time slots) 430, an MTP multiplexer 440, a High-Bandwidth Digital Content Protection (HDCP) encryption 450, a scrambler 460, and a PHY Layer Logical (Inter-lane skew, 8b/10 encoding) 470. The functional blocks of FIG. 4 are described in the DisplayPort 2.0 standard or the related standard and fall beyond the scope of the present disclosure.

In order to convert the N first format signal(s) into the N second format signal(s), an embodiment of the payload mapper of the present disclosure decrypts the N first format signal(s) according to the channeling coding of the N first format signal(s) to obtain N decrypted signal(s) first, and then encrypts the N decrypted signal(s) according to the channel coding of the N second format signal(s) to generate the N second format signal(s). Unfortunately, the above-mentioned embodiment consumes a lot of circuit area, computing resources, and power. In this embodiment, the payload mapper includes N mapper(s), each of which includes a decoder and an encoder that are used for converting a first format signal into a second format signal. The decoder includes a video decoder and an audio decoder used for decoding the first format signal and thereby generating a decoded signal; the encoder includes a video encoder and an audio encoder used for generating the second format signal according to the decoded signal.

Figure 5A:
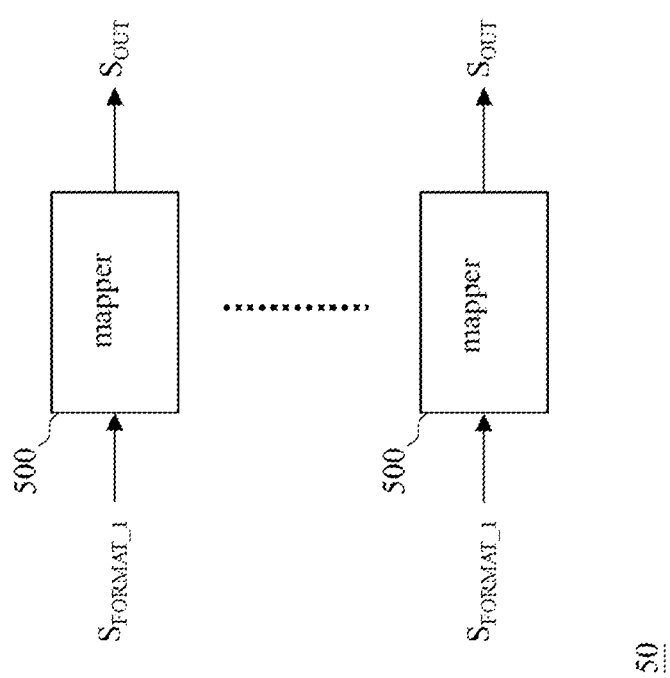
FIG. 5a shows an embodiment of the payload mapper of the present disclosure.
Figure 5B:
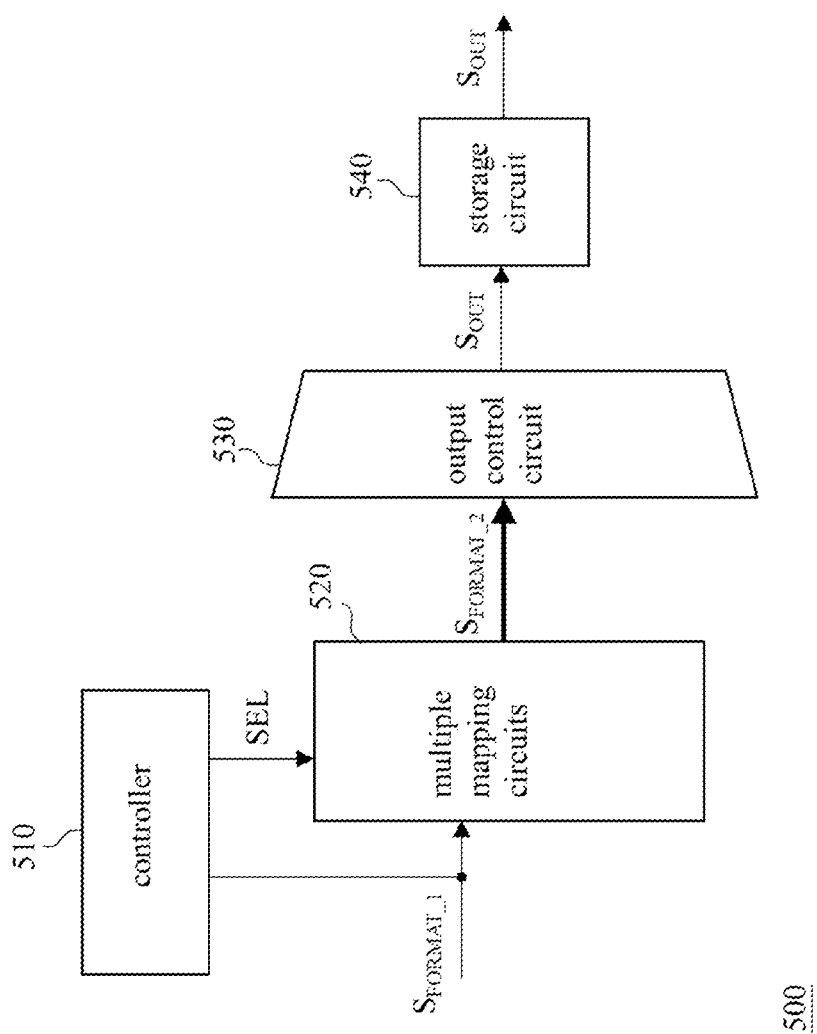

In light of the above, if the payload mapper is applied to a branch supporting the DisplayPort 2.0 standard, the payload mapper shall use more decoders and encoders on condition that the branch supports more streams (i.e., the number N gets bigger). However, according to the DisplayPort 2.0 standard, the branch has no need to figure out the content of an MST signal during the process of forwarding the MST signal; in fact, the branch only needs to perform the virtual channel payload mapper operation and rate governing operation. Based on the above understanding, another embodiment of the payload mapper of the present disclosure as shown in FIG. 5a is disclosed. The payload mapper 50 of FIG. 5a includes N mapper(s) 500, each of which is set between the front-end circuits and back-end circuits of a branch (e.g., the aforementioned DisplayPort branch); for example, each mapper 500 is set between the payload demuxer(s) 370 of FIG. 3 and the payload multiplexer(s) 410 of FIG. 4. FIG. 5b shows an embodiment for each mapper 500 of FIG. 5a. The mapper 500 of FIG. 5b is configured to convert a first format signal $S_{FORMAT\_2}$ into a second format signal $S_{FORMAT\_2}$ and output an effective signal $S_{OUT}$ accordingly, wherein the effective signal $S_{OUT}$ is equal to a part or all of the second format signal $S_{FORMAT\_2}$. The mapper 500 of FIG. 5b includes a controller 510, multiple mapping circuits 520, an output control circuit 530, and a storage circuit 540. It should be noted that the first format signal $S_{FORMAT\_1}$ (e.g., a signal from one of the payload demuxers 370 of FIG. 3) received by one of the mappers 500 of FIG. 5a is usually different from the first format signal $S_{FORMAT\_1}$ (e.g., a signal from another one of the payload demuxers 370 of FIG. 3) received by any of the other mapper(s) 500 of FIG. 5a.

Figure 6:
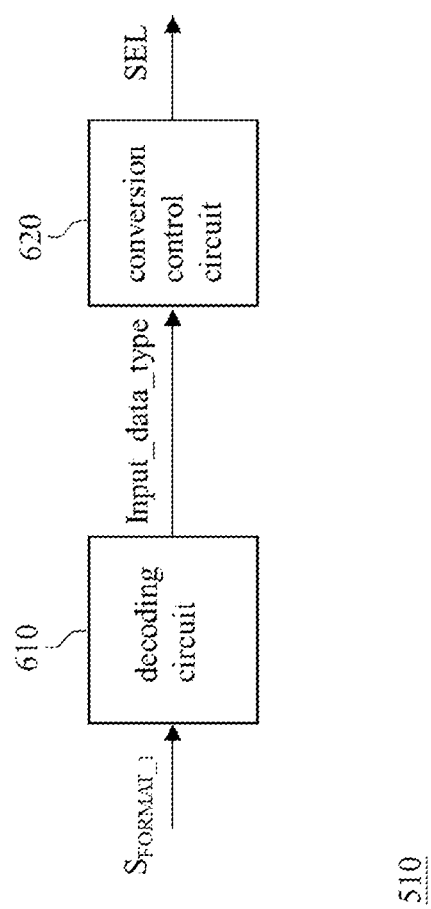
FIG. 6 shows an embodiment of the controller of FIG. 5b.

FIG. 6 shows an embodiment of the controller 510 of FIG. 5b. The controller 510 of FIG. 6 includes a decoding circuit 610 and a conversion control circuit 620. The decoding circuit 610 is configured to receive some or all of the first format signal $S_{FORMAT\_1}$ and then decode at least a part of the first format signal $S_{FORMAT\_1}$ so as to find out the type (Input_data_type) of a control signal related to the first format signal $S_{FORMAT\_1}$. For example, the first format signal $S_{FORMAT\_1}$ is a 128b/132b channel coding signal; it is originated from the aforementioned MST signal and includes four lane signals (ln0_demux[31:0], ln1_demux [31:0], ln2_demux[31:0], and ln3_demux[31:0]) and a control signal (ctrl). The control signal is used for indicating whether the four lane signals are control symbols (e.g., the signals BS, BE, SS, SE, SF, etc. as mentioned later) at the moment. The decoding circuit 610 receives at least a part of the four lane signals and the control signal and then performs a decoding operation so as to find out the type of the control signal. An example of the type of the control signal is Blanking Start (BS), Blanking End (BE), Secondary Data Start (SS), Secondary Data End (SE), or Stream Fill (SF) (meaningless symbol). The explanation for these types of the control signal is found in the DisplayPort 2.0 standard or the related standard. The conversion control circuit 620 is configured to generate a selecting signal SEL according to the type of the control signal, wherein the selecting signal SEL is used for making one of the multiple mapping circuits 520 of FIG. 5b perform conversion.

Figure 7A:
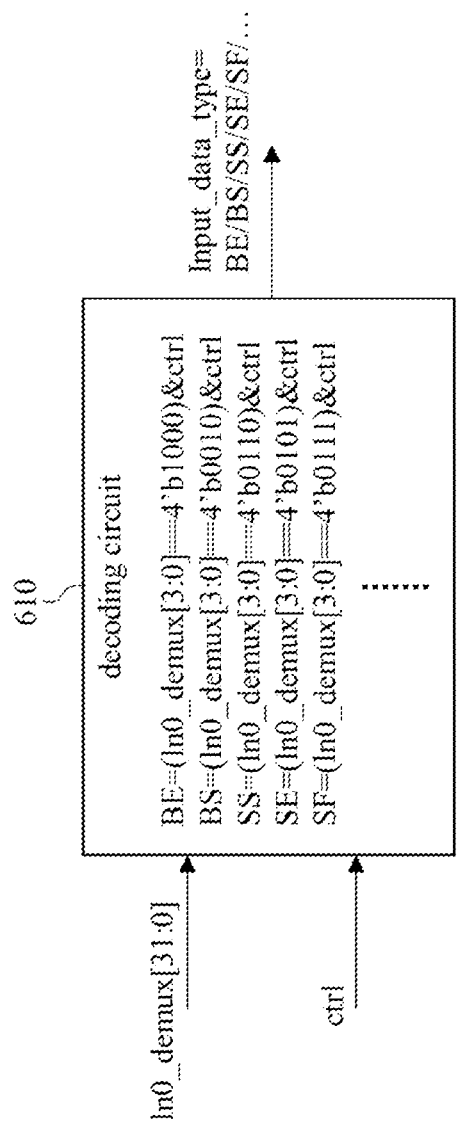
FIG. 7a shows an embodiment of the decoding circuit of FIG. 6.

FIG. 7a shows an embodiment of the decoding circuit 610. The decoding circuit 610 receives the aforementioned lane signal (e.g., ln1_demux[31:0]) and control signal (ctrl) and determines the type of the control signal according to the value (e.g., 4'b1000/4'b0010/4'b0110/4'b0101/4'b0111) of at least a part (e.g., ln0_demux[3:0]) of the whole lane signal (e.g., ln0_demux[31:0]) and further according to the control signal. For example, the type of the control signal is determined according to the following conditions: BE=(ln0_demux[3:0]==4'b1000)&ctrl; BS=ln0_demux [3:0]==4'b0010)&ctrl; SS=(ln0_demux[3:0]==4'b0110)& ctrl; SE=(ln0_demux[3:0]==4'b0101)&ctrl; and SF= (ln0_demux[3:0]==4'b0111)&ctrl. Those of ordinary skill in the art can use a known or self-developed technique to realize the decoding circuit 610 in accordance with the present disclosure.

Please refer to FIG. 6. In an exemplary implementation, the operation of the conversion control circuit 620 is controlled with at least one finite state machine (FSM). The at least one FSM selects one of the multiple mapping circuits 520 of FIG. 5b according to the type of the control signal and makes the selected mapping circuit 520 perform conversion. According to the DisplayPort standard, the operation of processing secondary data packet (SDP) can be split by the operation of processing vertical blanking vertical blanking ID (VB-ID), the operation of processing main stream attribute (MSA), or the operation of processing video based on transmission priority or the like; in other words, any of the operations of processing VB-ID, MSA, and video can cut in the operation of processing SDP. In order to take the above circumstances into consideration, an example of the at least one FSM includes a main stream FSM (st_main FSM) and an SDP stream FSM (st_sdp FSM). Since the two FSMs are designed to refer to each other, the conversion control circuit 620 can find out the condition of a split SDP operation. Those of ordinary skill in the art can use a known or self-developed technique to realize the at least one FSM in accordance with the present disclosure.

Figure 7B:
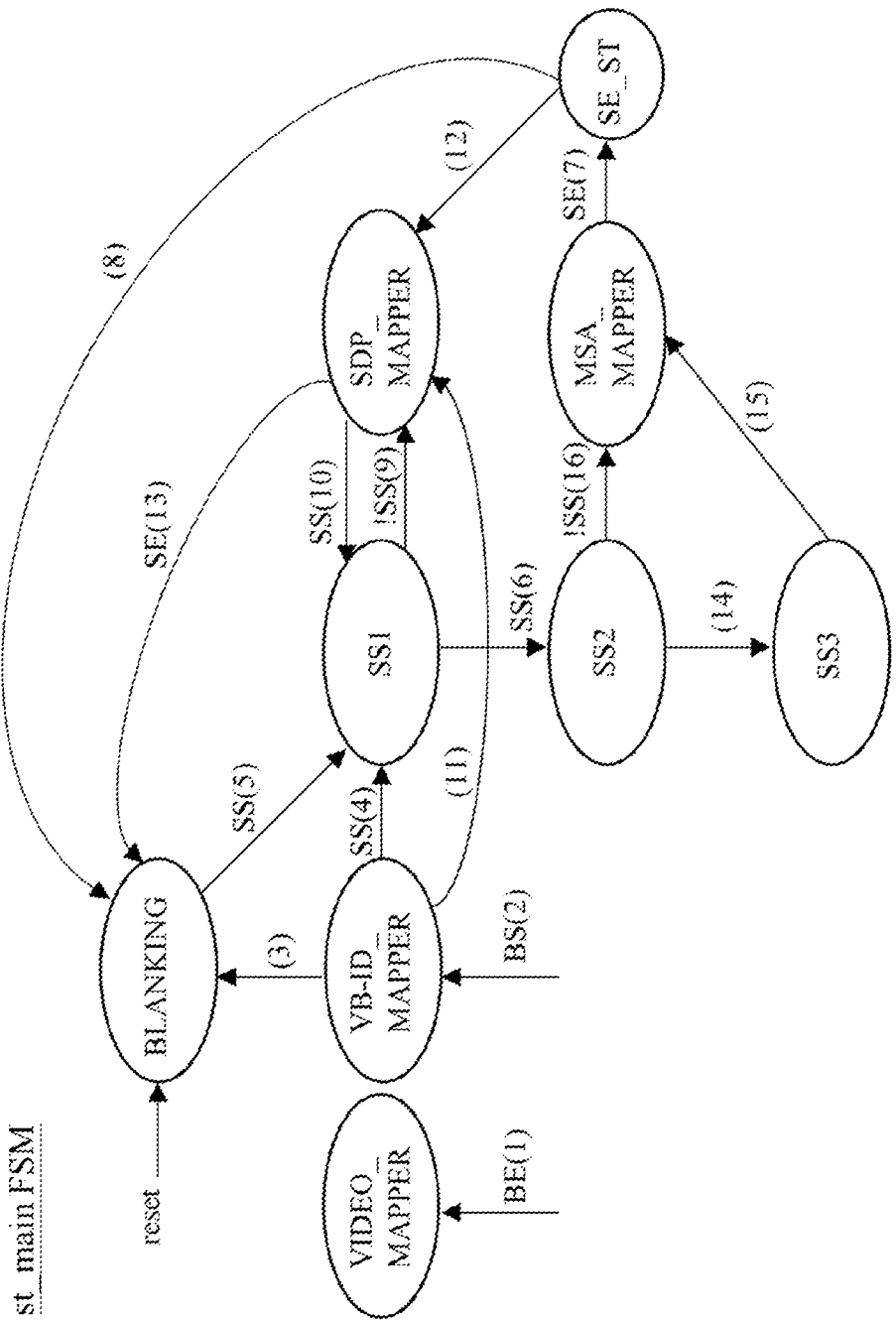
FIG. 7b shows an embodiment of the main stream finite state machine (FSM) of the conversion control circuit of FIG. 6.

FIG. 7b shows an embodiment of the aforementioned main stream FSM. Please refer to FIG. 7b; the changes of states (st_main) of the main stream FSM (hereafter, first FSM) are detailed as follows.

(1) If the first FSM is informed of Blanking End (BE) in any state, that is to say, the decoding circuit 610 informs the first FSM of the type of the control signal being BE, the first FSM enters a Video Mapping state (VIDEO_MAPPER) so as to choose a video mapping circuit, that is described in a later paragraph, as an activated block. It should be noted that if the first FSM is informed of BE in an SDP Mapping state (SDP_MAPEER), this shows that an SDP operation (i.e., an operation of processing an SDP) is split by a video operation (i.e., an operation of processing video), that is to say, the video operation cuts in the SDP operation.

(2) If the first FSM is informed of Blanking Start (BS) in any state, the first FSM enters a VB-ID Mapping state (VB-ID_MAPPER) so as to choose a VB-ID mapping circuit that is described in a later paragraph. It should be noted that if the first FSM is informed of BS in SDP_MAPEER, this shows that an SDP operation is split by a VB-ID operation (i.e., an operation of processing VB-ID).

(3) On the basis of (2), after VB-ID_MAPPER ends (e.g., after one cycle of a link symbol clock (lclk)), the first FSM returns to a Blanking state (BLANKING) from VB-ID_MAPPER providing no other trigger occurs. It should be noted that the first FSM enters BLANKING in response to the reset of the conversion control circuit 620.

(4) If the first FSM is informed of Secondary Data Start (SS) in VB-ID_MAPPER, the first FSM enters a first stage of a Secondary Data Start state (SS1); and if the first FSM is not informed of SS in VB-ID_MAPPER, the first FSM returns to BLANKING.

(5) If the first FSM is informed of SS in BLANKING, the first FSM enters SS1.

(6) If the first FSM is informed of SS in SS1, the first FSM enters a second stage of the
Secondary Data Start state (SS2); on the basis of the above, if the first FSM is informed of SS two times in a row, the first FSM enters an MSA Mapping state (MSA_MAPPER) from SS2 so as to choose an MSA mapping circuit that is described in a later paragraph.
(7) If the first FSM is informed of Secondary Data/MSA End (SE) in MSA_MAPPER, the first FSM enters an MSA End state (SE_ST).
(8) If the circumstance (12) is not sustained, the first FSM returns from SE_ST to BLANKING.
(9) If the first FSM is not informed of any SS in SS1 anymore, that is to say, it is informed of non-SS (!SS), this means that the type of following input data (Input data type) is the type of SDP data (SDP DATA) instead of the type of MSA data (MSA DATA), and the first FSM enters SDP_MAPPER to choose an SDP mapping circuit that is described in a later paragraph.
(10) If the first FSM is informed of SS two times in a row in SDP_MAPPER, this means that when the SDP mapping circuit is receiving/processing an SDP, the first FSM may receive MSA data; in the above circumstance, the first FSM enters MSA_MAPPER from SDP_MAPPER via SS1 and SS2 so as to choose the MSA mapping circuit.
(11) If the first FSM is not informed of SS in VB-ID_MAPPER and the SDP stream FSM is not in an idle state (IDLE), this means that an SDP operation is split by a VB-ID operation; therefore, after VB-ID_MAPPER ends, the first FSM returns to SDP_MAPPER directly to choose the SDP mapping circuit and resume the SDP operation.
(12) If the first FSM is not informed of SE in SE_ST and the SDP stream FSM is not in IDLE, this means that an SDP operation is split by an MSA data operation (i.e., an operation of processing MSA data); therefore, the first FSM returns to SDP_MAPPER from SE_ST to choose the SDP mapping circuit and resume the SDP operation.
(13) If the first FSM is informed of SE in SDP_MAPPER, the first FSM returns to BLANKING.
(14) If the first FSM is informed of SS three times in a row and the SDP stream FSM is not in
IDLE, it means that an SDP operation is split by an MSA data operation and this occurs when/before the first FSM is informed of SS of the SDP operation first time. In the above circumstance, the first FSM enters a third stage of a Secondary Data Start state (SS3).
(15) On the basis of the circumstance (14), the first FSM enters MSA_MAPPER.
(16) If the first FSM is informed of SS two times in a row and then it is not informed of SS (i.e., is informed of non-SS (!SS)), the first FSM enters MSA_MAPPER.

Please note that each pair of brackets and the number therein in FIG. 7b denotes one of the circumstances (1)~(16) listed above.

Figure 7C:
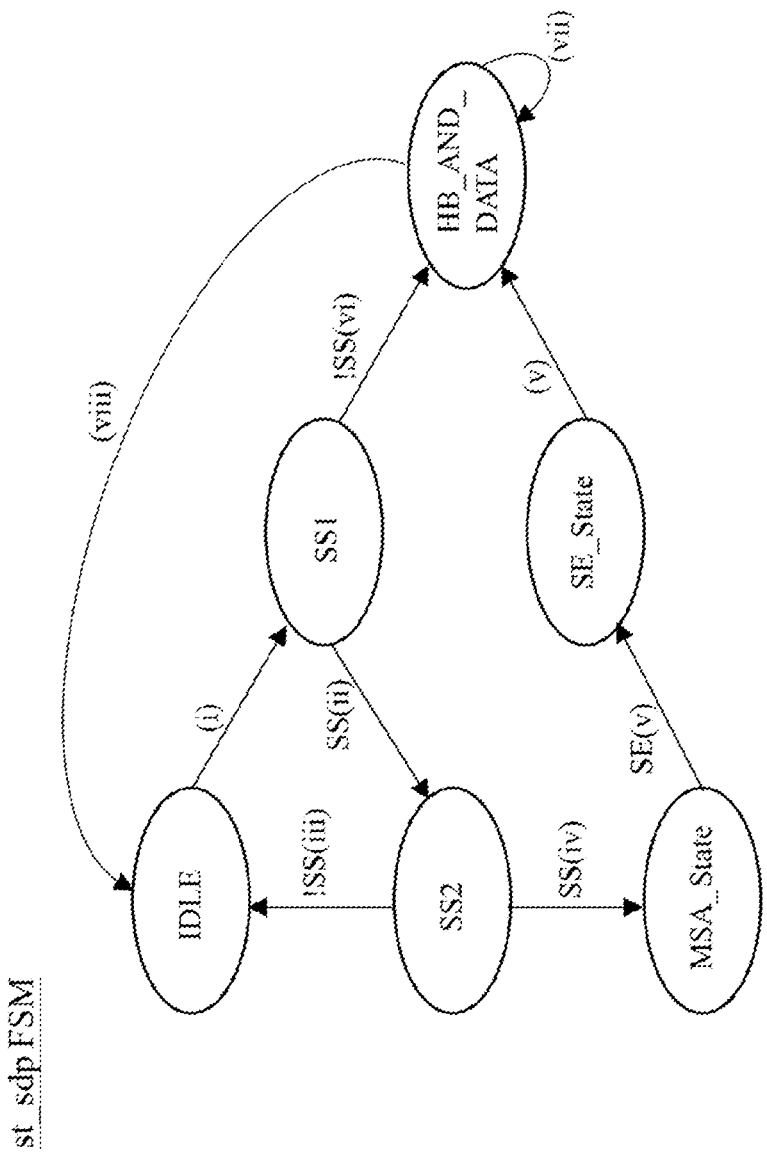
FIG. 7c shows an embodiment of the secondary data packet (SDP) stream FSM of the conversion control circuit of FIG. 6.

FIG. 7c shows an embodiment of the aforementioned SDP stream FSM. Please refer to FIG. 7c; the changes of states (st_sdp) of the SDP stream FSM (hereafter, second FSM) are detailed as follows.
(i) When the first FSM is in BLANKING or VB-ID_MAPPER, if the second FSM is informed of SS, that is to say, the decoding circuit 610 informs the second FSM of the type of the control signal being SS, the second FSM enters SS1; in the meantime, the type of following input data (i.e., MSA/SDP data) is not yet determined.
(ii) On the basis of the circumstance (i), if the second FSM is informed of SS again, the second FSM enters SS2; in the meantime, the type of following input data (i.e., MSA/SDP data) is not yet determined.
(iii) If the second FSM is informed of non-SS (!SS) in SS2, that is to say, the decoding circuit 610 informs the second FSM of the type of the control signal being not SS, it means that the type of following input data is the type of MSA data; since MSA data falls outside the jurisdiction of the second FSM, the second FSM returns to IDLE.
(iv) If the second FSM is informed of SS in SS2 (i.e., the second FSM is informed of SS three times in a row), it means that an SDP operation is split by an MSA data operation and this occurs when/before the second FSM is informed of SS of the SDP operation first time. In the above circumstance, the second FSM enters a Main Stream Attribute state (MSA_State). It should be noted that when the first FSM enters MSA_MAPPER, the second FSM doesn't necessarily have to enter MSA_State; on the contrary, when the second FSM enters MSA_State, the first FSM enters MSA_MAPPER to deal with the forwarding operation related to MSA while the second FSM has to record this situation because the second FSM being in MSA_State implies that an SDP operation is split by an MSA data operation. Accordingly, after the second FSM is informed of SE and leaves MSA_State, the second FSM can directly process secondary data packets.
(v) If the second FSM is informed of SE in MSA_State, this means that the situation of an SDP operation being split by an MSA data operation is about to end; in this circumstance, the second FSM enters a Secondary Data End state (SE_State) and thereby prepares to process the header byte (HB) and data byte (DB) of an SDP of the SDP operation.
(vi) If the second FSM is not informed of SS in SS1 (i.e., the second FSM is informed of non-SS (!SS)), it means that the type of following input data is the type of a complete SDP which is not split, and thus the second FSM enters a Header Byte and Data state (HB_AND_DATA) to choose the SDP mapping circuit.
(vii) In HB_AND_DATA, if the first FSM is not in SDP_MAPPER, it means that an SDP operation is split by another data operation (e.g., MSA/VB-ID/video data operation), and thus the second FSM returns to HB_AND_DATA. It should be noted that in a circumstance that the first FSM is in SDP_MAPPER and the second FSM is in HB_AND_DATA, the conversion control circuit 620 chooses the SDP mapping circuit; in the other circumstances, the conversion control circuit 620 chooses one of the other mapping circuits.
(viii) If the first FSM is in SDP_MAPPER or SE_ST and the second FSM is informed of SE, it means that an SDP operation has finished, and thus the second FSM returns to IDLE.

Please note that each pair of brackets and the number therein in FIG. 7c denotes one of the circumstances (i)~(viii) listed above.

Figure 7D:
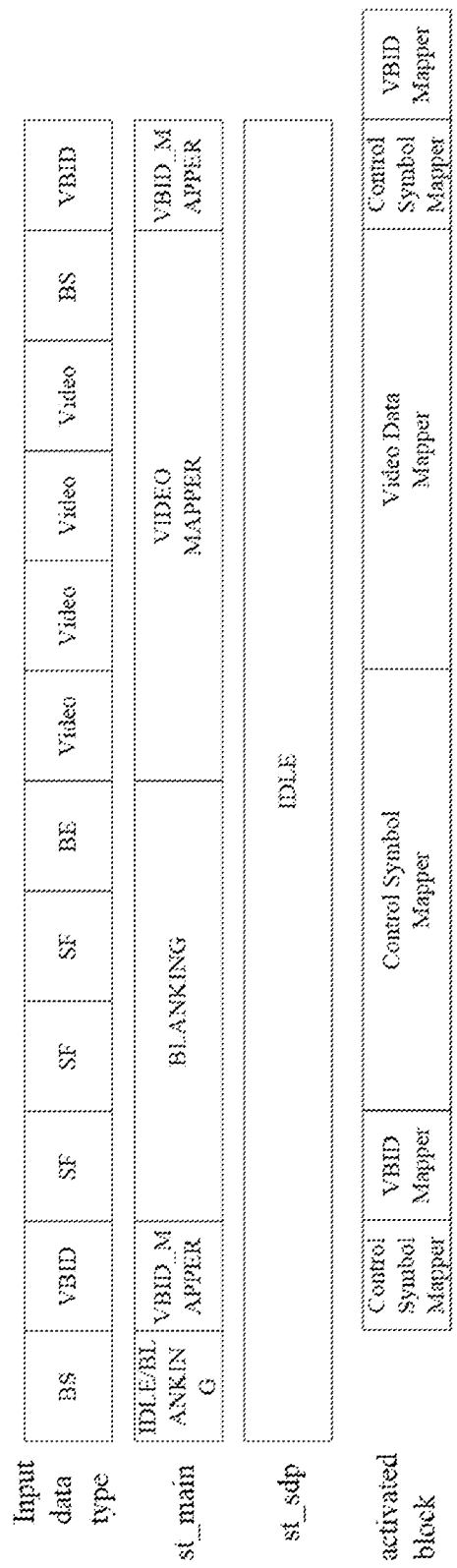
Figure 7E:
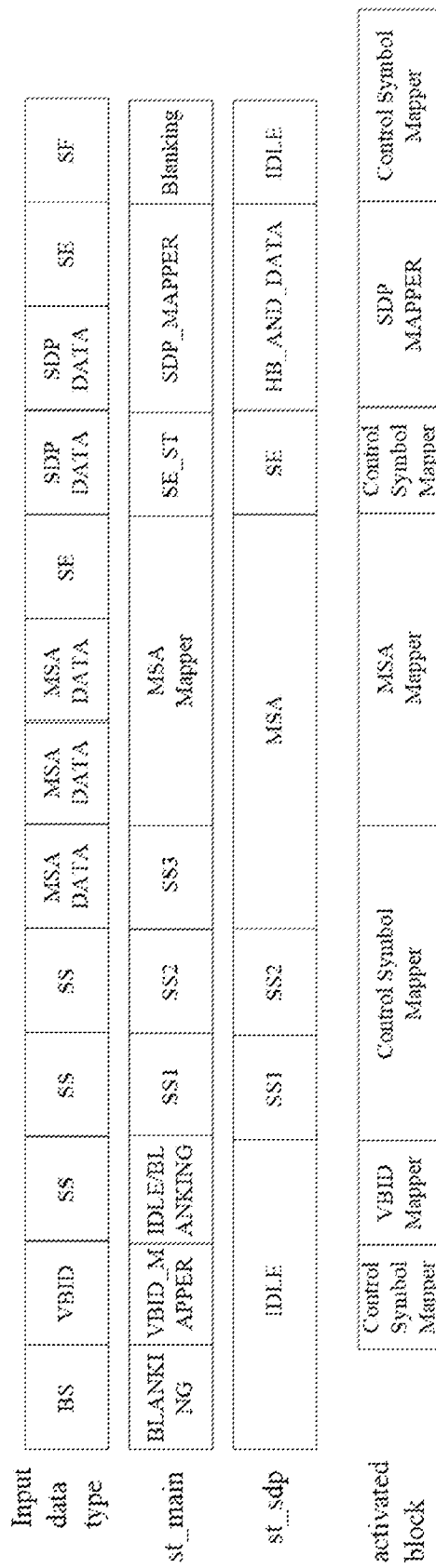

FIG. 7d shows how the conversion control circuit 620 chooses one of the multiple mapping circuits 520 as an activated block according to the type of the control signal (Input data type), the state of the main stream FSM (st_main), and the state of the SDP stream FSM (st_sdp) in a circumstance that the state of the SDP stream FSM remains in IDLE. FIGS. 7e-7g shows how the conversion control circuit 620 chooses one of the multiple mapping circuits 520 as an activated block according to the type of the control signal, the state of the main stream FSM, and the state of the SDP stream FSM in a circumstance that the state of the SDP stream FSM does not remain in IDLE.

Figure 8:
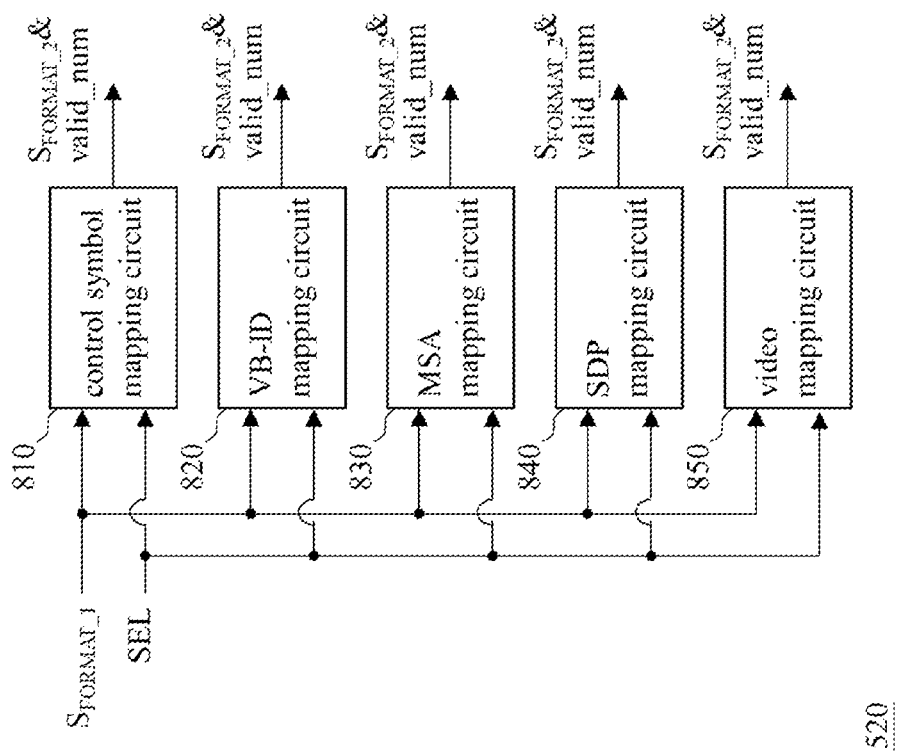
FIG. 8 shows an embodiment of the multiple mapping circuits of FIG. 5b.

FIG. 8 shows an embodiment of the multiple mapping circuits 520 of FIG. 5b. This embodiment is applicable to a branch supporting the DisplayPort 2.0 standard; however, some or all of the multiple mapping circuits 520 of FIG. 8 may be replaced with other circuits in different applications. Regarding the embodiment of FIG. 8, the channel coding of the first format signal $S_{FORMAT\_1}$ is the 128b/132b channel coding, and the channel coding of the second format signal $S_{FORMAT\_2}$ is the 8b/10b channel coding. The multiple mapping circuits 520 of FIG. 8 are configured to receive the first format signal $S_{FORMAT\_1}$ and the selecting signal SEL, and include a control symbol mapping circuit 810, a vertical blanking ID (VB-ID) mapping circuit 820, a main stream attribute (MSA) mapping circuit 830, a secondary data packet (SDP) mapping circuit 840, and a video mapping circuit 850. The selecting signal SEL is used for choosing one among the multiple mapping circuits 520 and then the selected mapping circuit 520 is used for converting the first format signal $S_{FORMAT\_1}$ into the second format signal $S_{FORMAT\_2}$. It should be noted that since the channel coding of the first format signal $S_{FORMAT\_1}$ and the channel coding of the second format signal $S_{FORMAT\_2}$ can be ascertained in advance, the data patterns (e.g., Tables 1-2, Tables 3-4, Tables 5-6, and Tables 7-8) of the first format signal $S_{FORMAT\_1}$ and second format signal $S_{FORMAT\_2}$ can also be ascertained according to the type of the control signal. Accordingly, the multiple mapping circuits 520 can perform data rearrangement according to the above-mentioned known information to realize the signal conversion. Those having ordinary skill in the art can use known or self-developed techniques to realize the multiple mapping circuits 520 of FIG. 8 in accordance with the present disclosure.

Please refer to FIG. 8. In a circumstance that the selecting signal SEL chooses the control symbol mapping circuit 810 to perform conversion, the first format signal $S_{FORMAT\_1}$ includes control symbols of the 128b/132b channel coding, the second format signal $S_{FORMAT\_2}$ includes control symbols of the 8b/10b channel coding, the relation between the control symbols of the 128b/132b channel coding and the control symbols of the 8b/10b channel coding is one on one, and thus the control symbol mapping circuit 810 can use a known or self-developed look-up table (LUT) technique in view of the relation to directly output some of the control symbols of the 128b/132b channel coding as the control symbols of the 8b/10b channel coding. In consideration of that one control symbol of the 8b/10b channel coding is 8-bit data, the control symbol mapping circuit 810 can use the effective part of the first format signal $S_{FORMAT\_1}$ (i.e., 8-bit data among 32-bit data) as the second format signal $S_{FORMAT\_2}$ and then output the second format signal $S_{FORMAT\_2}$ to the output control circuit 530; or the control symbol mapping circuit 810 can use all of the first format signal $S_{FORMAT\_1}$ (i.e., 32-bit data) as the second format signal $S_{FORMAT\_2}$ and output the second format signal $S_{FORMAT\_2}$ and a valid number (valid_num) (e.g., the second value=1 as mentioned later) to the output control circuit 530, wherein the valid number is used for informing the output control circuit 530 of the amount of the effective data of the second format signal $S_{FORMAT\_2}$ (i.e., 8-bit data among 32-bit data). For example, if the valid number is a first number/second number/third number/fourth number/fifth number (e.g., 0/1/2/3/4/5), the effective data will be 0/8/16/24/32-bit data. In the embodiment of FIG. 8, the valid number outputted by the selected mapping circuit 520 is not zero while the valid numbers outputted by the other mapping circuits 520 are zero.

Please refer to FIG. 8. In a circumstance that the selecting signal SEL chooses the VB-ID mapping circuit 820 to perform conversion, the first format signal $S_{FORMAT\_1}$ is a 128b/132b channel coding signal as illustrated in Table 1 below, the second format signal $S_{FORMAT\_2}$ is an 8b/10b channel coding signal as illustrated in Table 2 below, the data of each cell of Tables 1-2 is 2-bit data, the italic parts in Table 1 are data of the first format signal $S_{FORMAT\_1}$ directly outputted by the VB-ID mapping circuit 820 or data of the first format signal $S_{FORMAT\_1}$ amended and outputted by the VB-ID mapping circuit 820 as data of the second format signal $S_{FORMAT\_2}$ (i.e., the italic parts in Table 2), and Tables 1-2 and the description thereof are found in the DisplayPort standard. In addition, the video frequency ratio reference value Mvid of the 8b/10b channeling coding signal can be calculated by the MSA mapping circuit 830 according to the frequency (VFREQ) of its received original stream clock (sclk); more specifically, the MSA mapping circuit 830 can derive VFREQ (e.g., 150 MHz) from its received data, then calculate Mvid with a calculating circuit based on VFREQ=f_LS_CLK×(Mvid/Nvid), and then provide Mvid for the VB-ID mapping circuit 820 so that the VB-ID mapping circuit 820 can output Mvid, wherein "f_LS_CLK" is the frequency (e.g., 810 MHz) of a link symbol clock (lclk), "Nvid" is a setting number (e.g., 32768), and "f_LS_CLK" and "Nvid" can be ascertained in advance. Moreover, the audio frequency ratio reference value Maud of the 8b/10b channeling coding signal can be calculated by the SDP mapping circuit 840 according to the frequency (AFREQ) of its received original audio clock; more specifically, the SDP mapping circuit 840 can derive AFREQ (e.g., 48 KHz) from its received data, then calculate Maud with a calculating circuit based on 512×AFREQ=f_LS_CLK×(Maud/Naud), and then provide Maud for the VB-ID mapping circuit 820 so that the VB-ID mapping circuit 820 can output Maud, wherein "f_LS_CLK" is mentioned above, "Naud" is a setting number (e.g., 32768), and "f_LS_CLK" and "Naud" can be ascertained in advance. It should be noted that the VB-ID mapping circuit 820 can make use of at least one valid number (e.g., the aforementioned fourth number=3) to inform the output control circuit 530 of the amount of the effective data as previously mentioned.

TABLE 1

| Lane0 | Lane1 | Lane2 | Lane3 |
|-------|-------|-------|-------|
| VB-ID[7:0] | VB-ID[7:0] | VB-ID[7:0] | VB-ID[7:0] |
| *All 0s* | *All 0s* | *All 0s* | *All 0s* |
| *All 0s* | *All 0s* | *All 0s* | *All 0s* |
| All 0s | All 0s | All 0s | All 0s |

TABLE 2

| Lane0 | Lane1 | Lane2 | Lane3 |
|-------|-------|-------|-------|
| BS | BS | BS | BS |
| VB-ID | VB-ID | VB-ID | VB-ID |
| *Mvid7:0* | *Mvid7:0* | *Mvid7:0* | *Mvid7:0* |
| *Maud7:0* | *Maud7:0* | *Maud7:0* | *Maud7:0* |

Please refer to FIG. 8. In a circumstance that the selecting signal SEL chooses the MSA mapping circuit 830 to perform conversion, the first format signal $S_{FORMAT\_1}$ is a 128b/132b channel coding signal as illustrated in Table 3 below, the second format signal $S_{FORMAT\_2}$ is an 8b/10b channel coding signal as illustrated in Table 4 below, the data of each cell of Tables 3-4 is 2-bit data, the italic parts in Table 3 are data of the first format signal $S_{FORMAT\_1}$ directly outputted by the MSA mapping circuit 830 or data of the first format signal $S_{FORMAT\_1}$ amended and outputted by the MSA mapping circuit 830 as data of the second format signal $S_{FORMAT\_2}$ (i.e., the italic parts in Table 4), and Tables 3-4 and the description thereof are found in the DisplayPort standard. It should be noted that the conversion of VFREQ of Table 3 and the conversion of Mvid of Table 4 are previously mentioned. It should also be noted that the MSA mapping circuit 830 can make use of at least one valid number (e.g., three valid numbers that are the aforementioned fifth number=4, fifth number=4, and second number=1 in order) to inform the output control circuit 530 of the amount of the effective data as previously mentioned.

TABLE 3

| Lane0 | Lane1 | Lane2 | Lane3 |
|---|---|---|---|
| SS | SS | SS | SS |
| SS | SS | SS | SS |
| *All 0s* | *All 0s* | *All 0s* | *VFREQ[47:40]* |
| *All 0s* | *All 0s* | *All 0s* | *VFREQ[39:32]* |
| *All 0s* | *All 0s* | *All 0s* | *VFREQ[31:24]* |
| HTotal[15:8] | HStart[15:8] | HWidth[15:8] | *VFREQ[23:16]* |
| HTotal[7:0] | HStart[7:0] | HWidth[7:0] | *VFREQ[15:8]* |
| VTotal[15:8] | VStart[15:8] | VHeight[15:8] | *VFREQ[7:0]* |
| VTotal[7:0] | VStart[7:0] | VHeight [7:0] | MISC0[7:0] |
| HSP[0]\| HSW[14:8] | VSP[0]\|VSW[14:8] | All 0s | MISC1[7:0] |
| HSW[7:0] | VSW[7:0] | All 0s | All 0s |
| All 0s | All 0s | All 0s | All 0s |
| All 0s | All 0s | All 0s | All 0s |
| All 0s | All 0s | All 0s | All 0s |
| SE | SE | SE | SE |

TABLE 4

| Lane0 | Lane1 | Lane2 | Lane3 |
|---|---|---|---|
| SS | SS | SS | SS |
| SS | SS | SS | SS |
| *Mvid23:16* | *Mvid23:16* | *Mvid23:16* | *Mvid23:16* |
| *Mvid15:8* | *Mvid15:8* | *Mvid15:8* | *Mvid15:8* |
| *Mvid7:0* | *Mvid7:0* | *Mvid7:0* | *Mvid7:0* |
| Htotal15:8 | Hstart15:8 | Hwidth15:8 | NVid23:16 |
| Htotal7:0 | Hstart7:0 | Hwidth7:0 | NVid15:8 |
| Vtotal15:8 | Vstart15:8 | Vheight15:8 | NVid7:0 |
| Vtotal7:0 | Vstart7:0 | Vheight7:0 | MISC0_7:0 |
| HSP\|HSW14:8 | VSP\|VSW14:8 | All 0s | MISC1_7:0 |
| HSW7:0 | VSW7:0 | All 0s | All 0s |
| SE | SE | SE | SE |

Please refer to FIG. 8. In a circumstance that the selecting signal SEL chooses the SDP mapping circuit 840 to perform conversion, the first format signal $S_{FORMAT\_1}$ is a 128b/132b channel coding signal (i.e., an Audio Time Stamp packet in this case) as illustrated in Table 5 below, the second format signal $S_{FORMAT\_2}$ is an 8b/10b channel coding signal as illustrated in Table 6 below, the italic parts in Table 5 are data of the first format signal $S_{FORMAT\_1}$ directly outputted by the SDP mapping circuit 840 or data of the first format signal $S_{FORMAT\_1}$ amended and outputted by the SDP mapping circuit 840 as data of the second format signal $S_{FORMAT\_2}$ (i.e., the italic parts in Table 6), and Tables 5-6 and the description thereof are found in the DisplayPort standard. It should be noted that the conversion of AFREQ of Table 5 and the conversion of Maud of Table 6 are previously mentioned. It should also be noted that the SDP mapping circuit 840 can make use of at least one valid number to inform the output control circuit 530 of the amount of the effective data as previously mentioned.

TABLE 5

| Lane0 | Lane1 | Lane2 | Lane3 |
|---|---|---|---|
| SS | SS | SS | SS |
| HB1 | HB1 | HB2 | HB3 |
| *All 0s* | *All 0s* | *All 0s* | *All 0s* |
| *AFREQ[47:40]* | *AFREQ[47:40]* | *AFREQ[47:40]* | *AFREQ[47:40]* |
| *AFREQ[39:32]* | *AFREQ[39:32]* | *AFREQ[39:32]* | *AFREQ[39:32]* |
| *AFREQ[31:24]* | *AFREQ[31:24]* | *AFREQ[31:24]* | *AFREQ[31:24]* |
| *All 0s* | *All 0s* | *All 0s* | *All 0s* |
| *All 0s* | *All 0s* | *All 0s* | *All 0s* |
| *AFREQ[23:16]* | *AFREQ[23:16]* | *AFREQ[23:16]* | *AFREQ[23:16]* |
| *AFREQ[15:8]* | *AFREQ[15:8]* | *AFREQ[15:8]* | *AFREQ[15:8]* |
| *AFREQ[7:0]* | *AFREQ[7:0]* | *AFREQ[7:0]* | *AFREQ[7:0]* |
| *All 0s* | *All 0s* | *All 0s* | *All 0s* |
| *All 0s* | *All 0s* | *All 0s* | *All 0s* |
| SE | SE | SE | SE |

TABLE 6

| Lane0 | Lane1 | Lane2 | Lane3 |
|---|---|---|---|
| SS | SS | SS | SS |
| HB0 | HB1 | HB2 | HB3 |
| PB0 | PB1 | PB2 | PB3 |
| Maud 23:16 | Maud 23:16 | Maud 23:16 | Maud 23:16 |
| Maud 15:8 | Maud 15:8 | Maud 15:8 | Maud 15:8 |
| Maud 7:0 | Maud 7:0 | Maud 7:0 | Maud 7:0 |
| All 0s | All 0s | All 0s | All 0s |
| PB4 | PB5 | PB6 | PB7 |
| Naud 23:16 | Naud 23:16 | Naud 23:16 | Naud 23:16 |
| Naud 15:8 | Naud 15:8 | Naud 15:8 | Naud 15:8 |
| Naud 7:0 | Naud 7:0 | Naud 7:0 | Naud 7:0 |
| All 0s | All 0s | All 0s | All 0s |
| PB8 | PB9 | PB10 | PB11 |
| SE | SE | SE | SE |

Please refer to FIG. 8. In a circumstance that the selecting signal SEL chooses the video mapping circuit 850 to perform conversion, the first format signal $S_{FORMAT\_1}$ is a 128b/132b channel coding signal as illustrated in Table 7 below, the second format signal $S_{FORMAT\_2}$ is an 8b/10b channel coding signal as illustrated in Table 8 below, the data in Table 7 are directly outputted by the video mapping circuit 850 as the data in Table 8 or are amended and outputted by the video mapping circuit 850 as the data in Table 8, and Tables 7-8 and the description thereof are found in the DisplayPort standard. It should be noted that since a 128b/132b channeling coding signal carries 16 bytes per clock cycle (i.e., the cycle of the link symbol clock) and an 8b/10b channeling coding signal carries 4 bytes per clock cycle (i.e., the cycle of the link symbol clock), the amount of the dummy symbols of the first format signal $S_{FORMAT\_1}$ may be different from that of the second format signal $S_{FORMAT\_2}$. In order to make the two amounts match, the video mapping circuit 850 can determine how many pieces of data of the first format signal $S_{FORMAT\_1}$ should be discarded with calculation according to some information (e.g., hwidth, color format, color bit, etc.) decoded by the MSA mapping circuit 830. For example, providing "hwidth" is 1000, "color format" is RGB, and "color bits" are 8 bits, one can infer that each of the four data transmission lanes is responsible for transmitting 1000/4×(8×3)=6000 bits; if this data are transmitted in the form of an 8b/10b channel coding signal, it takes 6000/8=750 cycles to transmit all the 6000 bits on condition that an 8b/10b signal carries 8 bits per cycle of the link symbol clock (lclk); but if the data are transmitted in the form of a 128b/132b channel coding signal, it takes 6000/32=187.5 (round up)=188 cycles to transmit all the 6000 bits on condition that a 128b/132b signal carries 32 bits per cycle of the link symbol clock (lclk). In light of the above, the valid number for the 128b/132b signal in the last cycle (i.e., 188$^{th}$ cycle) can be the aforementioned third number (i.e., 2) to realize the transmission of the first 16 bits and the discard of the last 16 bits while the valid number for each of the 128b/132b signals in the other 187 cycles can be the aforementioned fifth number (i.e., 4) to realize the transmission of the total 32 bits.

aforementioned main stream FSM state (st_main) and SDP stream FSM state (st_sdp). In addition, the multiplexer 950 can also be configured to receive Maud derived from AFREQ as a part of the second format signal $S_{FORMAT\_2}$. Maud and Naud are usually found in an Audio Time Stamp SDP. Those having ordinary skill in the art can use known and/or self-developed techniques to implement each circuit in FIG. 9 without undue experiment.

Figure 9:
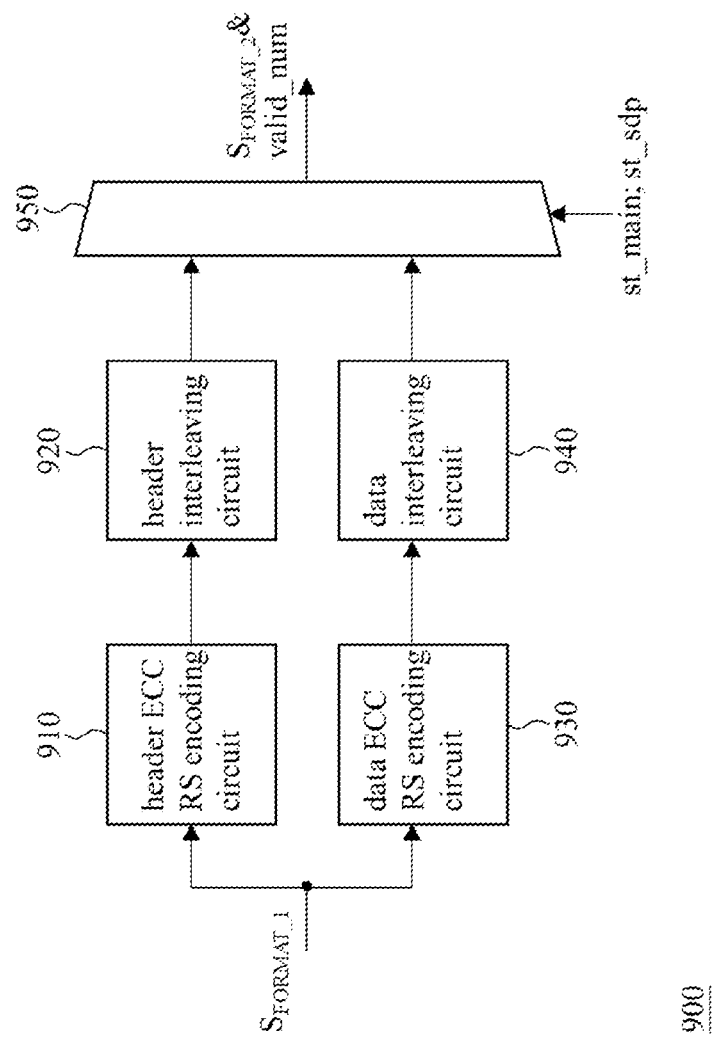
FIG. 9 shows an embodiment of the encoding and interleaving circuit of the SDP mapping circuit of FIG. 8.

It should be noted that the valid number outputted by the multiplexer 950 of FIG. 9 may be adaptively adjusted according to the size of SDP data. For example, Table 9 below shows the 128b/132b channel coding data received by the SDP mapping circuit 840, wherein the italic parts in Table 9 are data outputted by the SDP mapping circuit 840. The italic parts can be classified into two data groups. All the 32-bit data of the first data group (i.e., the data of the second row (HB1~HB3) through the data of fifth row (DB4~DB7)

TABLE 7

| Lane0 BE | | Lane1 BE | | Lane2 BE | | Lane3 BE | |
|---|---|---|---|---|---|---|---|
| Lan0 Pixel Data Link Symbol 0 of Video Horizontal Active Line N | Byte0 = R0-7:0 Byte1 = G0-7:0 Byte2 = B0-7:0 Byte3 = R4-7:0 | Lan1 Pixel Data Link Symbol 0 of Video Horizontal Active Line N | Byte0 = R1-7:0 Byte1 = G1-7:0 Byte2 = B1-7:0 Byte3 = R5-7:0 | Lan2 Pixel Data Link Symbol 0 of Video Horizontal Active Line N | Byte0 = R2-7:0 Byte1 = G2-7:0 Byte2 = B2-7:0 Byte3 = R6-7:0 | Lan3 Pixel Data Link Symbol 0 of Video Horizontal Active Line N | Byte0 = R3-7:0 Byte1 = G3-7:0 Byte2 = B3-7:0 Byte3 = R7-7:0 |
| Lan0 Pixel Data Link Symbol 1 of Video Horizontal Active Line N | Byte0 = G4-7:0 Byte1 = B4-7:0 Byte2 = R8-7:0 Byte3 = G8-7:0 | Lan1 Pixel Data Link Symbol 1 of Video Horizontal Active Line N | Byte0 = G5-7:0 Byte1 = B5-7:0 Byte2 = R9-7:0 Byte3 = G9-7:0 | Lan2 Pixel Data Link Symbol 1 of Video Horizontal Active Line N | Byte0 = G6-7:0 Byte1 = B6-7:0 Byte2 = R10-7:0 Byte3 = G10-7:0 | Lan3 Pixel Data Link Symbol 1 of Video Horizontal Active Line N | Byte0 = G7-7:0 Byte1 = B7-7:0 Byte2 = R11-7:0 Byte3 = G11-7:0 |

TABLE 8

| Lane0 | Lane1 | Lane2 | Lane3 |
|---|---|---|---|
| BE | BE | BE | BE |
| R0-9:2 | R1-9:2 | R2-9:2 | R3-9:2 |
| R0-1:0\|G0-9:4 | R1-1:0\|G1-9:4 | R2-1:0\|G2-9:4 | R3-1:0\|G3-9:4 |
| G0-3:0\|B0-9:6 | G1-3:0\|B1-9:6 | G2-3:0\|B2-9:6 | G3-3:0\|B3-9:6 |
| B0-5:0\|R4-9:8 | B1-5:0\|R5-9:8 | B2-5:0\|R6-9:8 | B3-5:0\|R7-9:8 |

In a circumstance that the selecting signal SEL chooses the SDP mapping circuit 840 to perform conversion, since the header byte (HB) and data byte (DB) of the data signal (lane0_data[31:0], lane1_data[31:0]. lane2_data[31:0], lane2_data[31:0]) of the second format signal $S_{FORMAT\_2}$ need to be processed with Reed Solomon (RS) encoding and interleaving operation, the SDP mapping circuit 840 should not only perform the mapping operation but also perform the RS encoding and interleaving operation to the first format signal $S_{FORMAT\_1}$ with an encoding and interleaving circuit to obtain the header byte and data byte. FIG. 9 shows an embodiment of the encoding and interleaving circuit. The encoding and interleaving circuit 900 of FIG. 9 includes a header ECC (error correction code) RS encoding circuit 910, a header interleaving circuit 920, a data ECC RS encoding circuit 930, a data interleaving circuit 940, and a multiplexer 950. The multiplexer 950 is configured to output the processed data signal (lane0_data[31:0], lane1_data[31:0], lane2_data[31:0], lane2_data[31:0]), a valid number as previously mentioned, and the aforementioned control signal (ctrl) to the output control circuit 530 according to the of Table 9) should be outputted and thus the valid number for the first data group can be the aforementioned fifth number (i.e., 4). The last 8-bit data (i.e., the data of the ninth row (0~0) of Table 9) among the 32-bit data of the second data group (i.e., the data of the sixth row (DB8~DB11) through the data of ninth row (0~0) of Table 9) need not be outputted and thus the valid number for the second data group can be the aforementioned fourth number (i.e., 3). In Table 9, the italic parts in bold are header bytes and the other italic parts are data bytes.

TABLE 9

| Lane0 | Lane1 | Lane2 | Lane3 |
|---|---|---|---|
| SS | SS | SS | SS |
| HB1 | HB1 | HB2 | HB3 |
| *0* | *0* | *0* | *0* |
| *DB0* | *DB1* | *DB2* | *DB3* |
| *DB4* | *DB5* | *DB6* | *DB7* |
| *DB8* | *DB9* | *DB10* | *DB11* |
| *DB12* | *DB13* | *DB14* | *DB15* |
| *0* | *0* | *0* | *0* |
| *0* | *0* | *0* | *0* |
| SE | SE | SE | SE |

Please refer to FIG. 5b. The output control circuit 530 (e.g., multiplexer) is configured to output at least a part of the second format signal $S_{FORMAT\_2}$ as an effective output signal $S_{OUT}$ according to the output of the multiple mapping circuits 520 (e.g., the second format signal $S_{FORMAT\_2}$ and all the valid numbers (valid_num) outputted by the multiple mapping circuits 520). An example of the at least a part of the second format signal $S_{FORMAT\_2}$ includes four lane signals and a control signal as previously mentioned.

Please refer to FIG. 5b. The storage circuit 540 (e.g., a known/self-developed asynchronous FIFO) is configured to receive and output the effective output signal $S_{OUT}$. Regarding the embodiments of FIGS. 5a-5b, the payload mapper 50 receives the first format signal $S_{FORMAT\_1}$ from a source circuit (e.g., a DisplayPort device using the 128b/132b channel coding) and outputs the effective output signal $S_{OUT}$ to a destination circuit (e.g., a DisplayPort device using the 8b/10b channel coding). The source circuit operates in a first clock domain (e.g., a clock domain with a link symbol clock (lclk) having the frequency 625 MHz); the destination circuit operates in a second clock domain (e.g., a clock domain with a link symbol clock having the frequency 810 MHz); the first clock domain is different from the second clock domain; and the storage circuit 540 receives the effective output signal $S_{OUT}$ from the output control circuit 530 according to a clock (e.g., the lclk having the frequency 625 MHz) of the first clock domain and then outputs the effective output signal $S_{OUT}$ to the destination circuit according to a clock (e.g., the lclk having the frequency 810 MHz) of the second clock domain. Please note that the storage circuit 540 may output data optionally according to a signal from the destination circuit (e.g., a request from the payload multiplexer 410 of FIG. 4).

Figure 10:
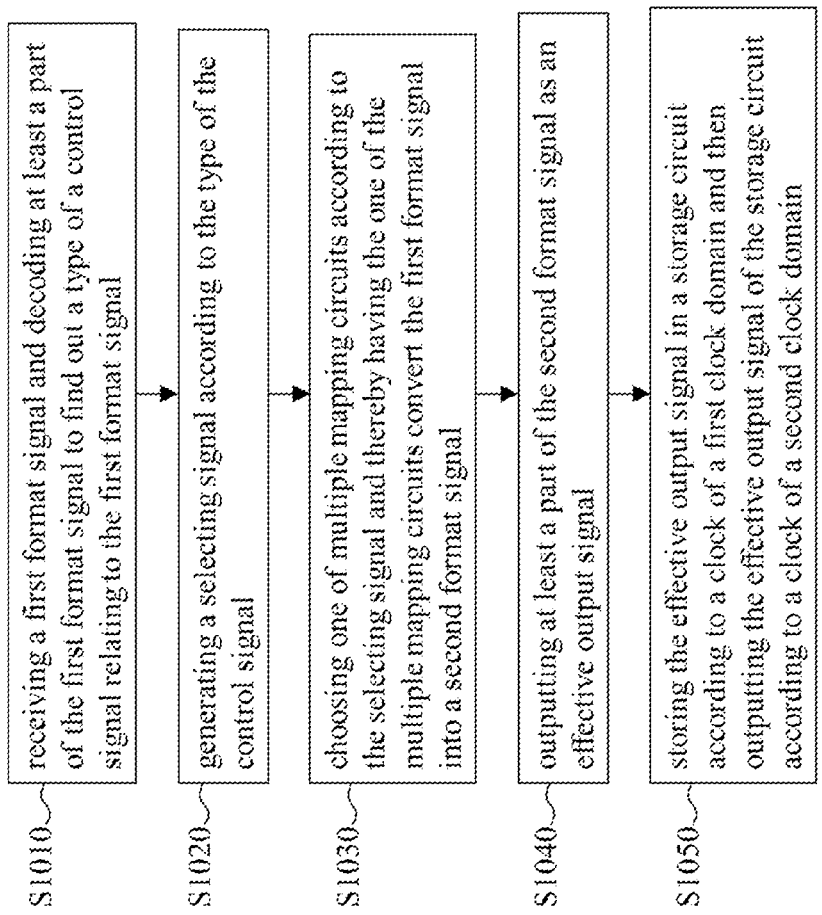
FIG. 10 shows an embodiment of the payload mapping method of the present disclosure.

The present disclosure also discloses a payload mapping method that is performed with N mapper(s), wherein the N is a positive integer, and each of the N mapper(s) is configured to convert a first format signal into a second format signal. FIG. 10 shows an embodiment of the payload mapping method including the following steps:

S1010: receiving the first format signal and decoding at least a part of the first format signal so as to find out a type of a control signal relating to the first format signal;

S1020: generating a selecting signal according to the type of the control signal;

S1030: choosing one of multiple mapping circuits according to the selecting signal and thereby having the one of the multiple mapping circuits convert the first format signal into the second format signal;

S1040: outputting at least a part of the second format signal as an effective output signal; and S1050: storing the effective output signal in a storage circuit according to a clock of a first clock domain and then outputting the effective output signal of the storage circuit according to a clock of a second clock domain.

Since those of ordinary skill in the art can refer to the disclosure of the device embodiments to appreciate the detail and modification of the method embodiment, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the present invention can convert a first format signal into a second format signal in a cost-effective and efficient manner.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A payload mapper including N mapper(s), wherein the N is a positive integer, and each of the N mapper(s) is configured to convert a first format signal into a second format signal and comprises:
   a controller including:
      a decoding circuit configured to receive the first format signal and decode at least a part of the first format signal so as to find out a type of a control signal relating to the first format signal; and
      a conversion control circuit configured to generate a selecting signal according to the type of the control signal, wherein the selecting signal chooses one of multiple mapping circuits for performing conversion;
   the multiple mapping circuits, configured to receive the first format signal and the selecting signal, including:
      a control symbol mapping circuit configured to convert the first format signal into the second format signal on condition that the selecting signal chooses the control symbol mapping circuit;
      a vertical blanking identifier (VB-ID) mapping circuit configured to convert the first format signal into the second format signal on condition that the selecting signal chooses the VB-ID mapping circuit;
      a main stream attribute (MSA) mapping circuit configured to convert the first format signal into the second format signal on condition that the selecting signal chooses the MSA mapping circuit;
      a secondary data packet (SDP) mapping circuit configured to convert the first format signal into the second format signal on condition that the selecting signal chooses the SDP mapping circuit; and
      a video mapping circuit configured to convert the first format signal into the second format signal on condition that the selecting signal chooses the video mapping circuit;
   an output control circuit, coupled to the multiple mapping circuits, configured to output at least a part of the second format signal as an effective output signal; and
   a storage circuit configured to receive and output the effective output signal.

2. The payload mapper of claim 1, wherein the N is greater than one.

3. The payload mapper of claim 1, wherein the payload mapper receives the first format signal from a source circuit and outputs the effective output signal to a destination circuit, the source circuit operates in a first clock domain, the destination circuit operates in a second clock domain, and the first clock domain is different from the second clock domain.

4. The payload mapper of claim 3, wherein the storage circuit receives the effective output signal from the output control circuit according to a clock of the first clock domain, and then outputs the effective output signal to the destination circuit according to a clock of the second clock domain.

5. A payload mapper including N mapper(s), wherein the N is a positive integer, and each of the N mapper(s) is configured to convert a first format signal into a second format signal and comprises:
   a controller including:
      a decoding circuit configured to receive the first format signal and decode at least a part of the first format signal so as to find out a type of a control signal relating to the first format signal; and a conversion control circuit configured to generate a selecting signal according to the type of the control signal, wherein the selecting signal chooses one of multiple mapping circuits for performing conversion;

the multiple mapping circuits configured to receive the first format signal and the selecting signal, wherein the one of the multiple mapping circuits converts the first format signal into the second format signal according to the selecting signal;

an output control circuit, coupled to the multiple mapping circuits, configured to output at least a part of the second format signal as an effective output signal; and a storage circuit configured to receive and output the effective output signal, wherein a channel coding relating to the first format signal is different from a channel coding relating to the second format signal.

6. The payload mapper of claim 5, wherein the N is greater than one.

7. The payload mapper of claim 5, wherein the payload mapper is included in a DisplayPort branch supporting a DisplayPort 2.0 standard, and the first format signal is originated from a multi-stream transport signal.

8. The payload mapper of claim 5, wherein an operation of the conversion control circuit is controlled by a finite state machine (FSM) circuit.

9. The payload mapper of claim 5, wherein the payload mapper receives the first format signal from a source circuit and outputs the second format signal to a destination circuit, the source circuit operates in a first clock domain, the destination circuit operates in a second clock domain, and the first clock domain is different from the second clock domain.

10. The payload mapper of claim 9, wherein the storage circuit receives the second format signal from the output control circuit according to a clock of the first clock domain, and then outputs the second format signal to the destination circuit according to a clock of the second clock domain.

11. A payload mapping method performed with N mapper(s), wherein the N is a positive integer, each of the N mapper(s) is configured to convert a first format signal into a second format signal, and the payload mapping method comprises:

receiving the first format signal and decoding at least a part of the first format signal so as to find out a type of a control signal relating to the first format signal;

generating a selecting signal according to the type of the control signal;

choosing one of multiple mapping circuits according to the selecting signal and thereby having the one of the multiple mapping circuits convert the first format signal into the second format signal;

outputting at least a part of the second format signal as an effective output signal; and storing the effective output signal in a storage circuit according to a clock of a first clock domain and then outputting the effective output signal of the storage circuit according to a clock of a second clock domain.

* * * * *